United States Patent [19]
Gordon et al.

[11] 3,927,983
[45] Dec. 23, 1975

[54] CONTINUOUS STAGED ISOBARIC STIRRED POLYMERIZATION APPARATUS

[75] Inventors: Robert E. Gordon, Monson; Robert W. Jones, Wilbraham; Rajendra Paul, Agawam; Robert H. M. Simon, Longmeadow, all of Mass.

[73] Assignee: Monsanto Company, St. Louis, Mo.

[22] Filed: Sept. 19, 1973

[21] Appl. No.: 398,722

[52] U.S. Cl. ............. 23/260; 23/253 A; 23/285; 260/95 C; 260/880 R
[51] Int. Cl.² ............. B01J 1/00; C08L 9/06
[58] Field of Search...... 23/285, 260, 252 R, 253 A; 260/879, 880

[56] References Cited
UNITED STATES PATENTS

| | | | |
|---|---|---|---|
| 3,013,866 | 12/1961 | Samaniego et al. | 23/252 R X |
| 3,074,922 | 1/1963 | Dye et al. | 23/285 UX |
| 3,245,762 | 4/1966 | Ullrich et al. | 23/285 |
| 3,251,657 | 5/1966 | Bachmann et al. | 23/285 |
| 3,254,071 | 5/1966 | Morgan et al. | 23/252 R X |
| 3,298,779 | 1/1967 | Goto et al. | 23/285 X |
| 3,337,508 | 8/1967 | Bachmann et al. | 23/285 X |
| 3,358,422 | 12/1967 | Van Der Schee | 23/285 X |
| 3,498,754 | 3/1970 | Yamashita et al. | 23/285 |
| 3,591,344 | 7/1971 | Schnock et al. | 23/285 |
| 3,617,225 | 11/1971 | Kuehne et al. | 23/285 |
| 3,752,447 | 8/1973 | Chen | 23/252 R X |
| 3,794,471 | 2/1974 | Latinen | 23/285 |
| 3,840,509 | 10/1974 | Kajimoto et al. | 260/880 R |

Primary Examiner—Morris O. Wolk
Assistant Examiner—Roger F. Phillips
Attorney, Agent, or Firm—Joseph S. Nelson; Edward P. Grattan; James C. Logomasini

[57] ABSTRACT

Continuous polymerization apparatus comprising a generally cylindrical enclosed vessel having input and output ports and adapted for operation in a generally horizontal configuration, at least one shaft means extending longitudinally through said vessel, a plurality of baffle-like members extending transversely across the interior of said vessel adapted to partition said vessel into compartments being longitudinally fixed to said vessel or said shaft and having radial clearances with said vessel defining top apertures for the passage of vapors and bottom apertures for the substantially linear flow of polymerizing fluids, agitator blade means being functionally associated with said shaft means and positioned in each of said compartments being adapted to maintain fluid partially filling said vessel under shearing agitation and in homogeneous condition in each compartment, vapor removal means functionally associated with the upper portion of said vessel adapted to remove vapors evolved from the polymerizing fluid reaction media in each of said compartments under controlled isobaric conditions providing temperature and polymerization control in each of said compartments, condenser means to condense said vapors and return to said vessel and flow regulating means associated with said input and said output ports to maintain the average particle fillage of said vessel and said chambers within predetermined limits.

25 Claims, 9 Drawing Figures

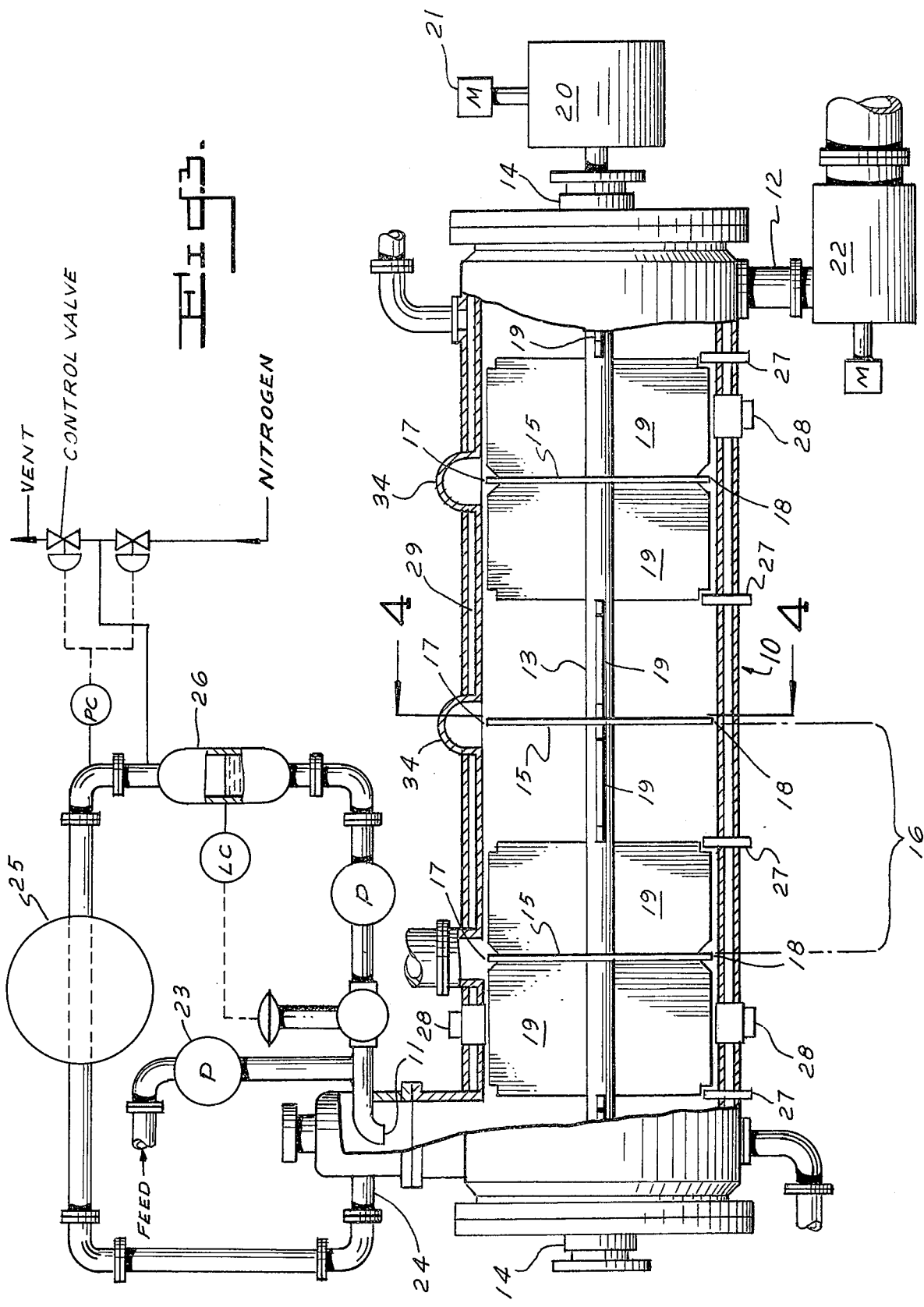

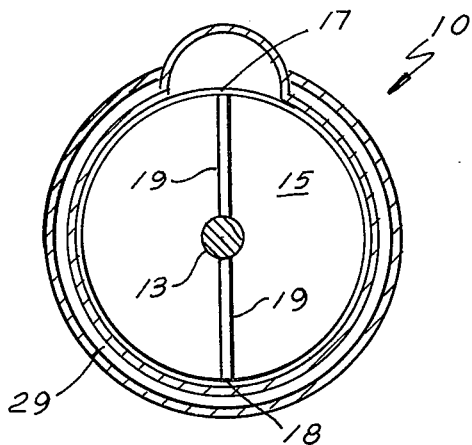
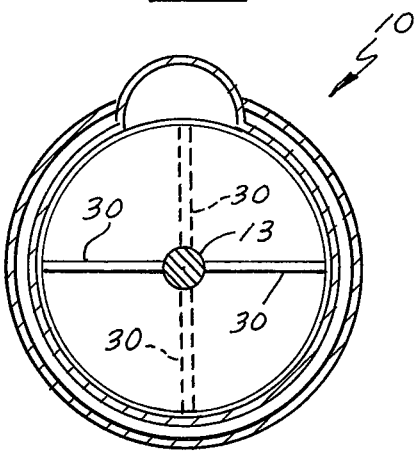
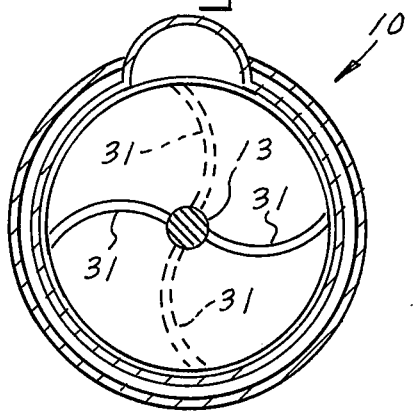
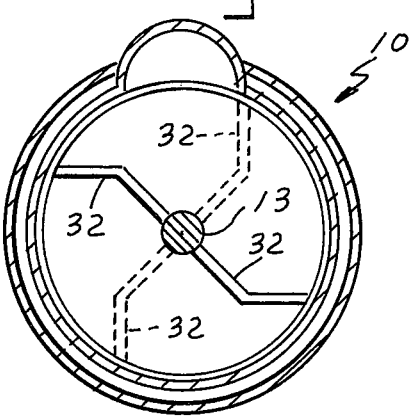
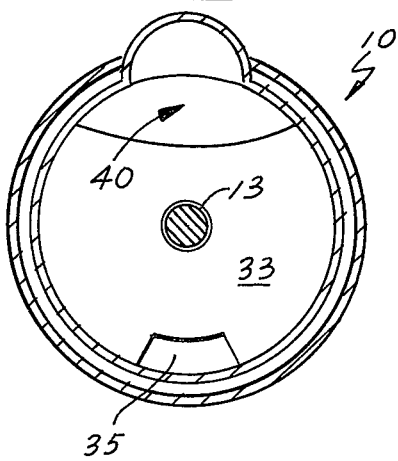
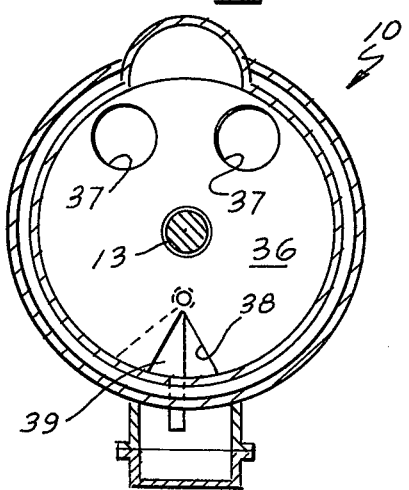

CONTINUOUS STAGED ISOBARIC STIRRED POLYMERIZATION APPARATUS

BACKGROUND OF THE INVENTION

The present invention relates to continuous polymerization apparatus and in particular to staged isobaric stirred reactors wherein progressive polymerization can be carried out in polymerizing mixtures under substantially linear flow with shearing agitation. The reactor provides for operation under partial fillage, monomer removal under isobaric boiling conditions for cooling and temperature control and return of monomers to the early stages having high polymerization rates to give highly efficient conversion of monomers per unit volume of reactor and fillage.

Continuous mass polymerization processes have all had the problem of removing the exothermic heat of polymerization from high viscous polymerizing masses having low heat transfer coefficients. Beyond the problem of removing heat is the very real problem of maintaining a uniform temperature throughout the polymerizing mass since the kinetics of polymerization is extremely temperature sensitive. In addition, continuous tank reactors that are run at high levels of conversion have a low polymerization rate making them inefficient reactors, hence require large reactors to insure adequate yields. Such processes have generally used stirred tank reactors as towers. Stirring aids temperature control and gives uniformity to polymerizing mixtures having more than one phase.

The most common form of stirred tank usually has the longest dimension in a vertical configuration and presents the problem of channeling or back mixing and nonuniformity throughout the mass particularly as the conversion increases and viscosities rise. Turbine, spiral and anchor type agitators have been used for mixing with the anchor type being used for high viscosity polymerizing syrups.

The tower reactor is most commonly used to finish off partially polymerized syrups. Here channeling of low viscosity syrups through the reactor creates a problem and some horizontal mixing may be used for temperature uniformity and dispersion of phases. However, as the viscosities become higher with polymerization, mixing is not feasible and temperature control and non-uniformity of the polymerizing mass are common problems making it difficult to control polymer and product properties. Hence, usually several reactor towers of small cross-section are used in series in large plants to progressively polymerize a polymerizing mixture. Each reactor is run at a slightly higher temperature for temperature control and to reach high conversions. Such a series of interdependent reactors are difficult to control both as to operations and product control. The multiplicity of tanks, agitators, pumps, piping, etc., make such continuous polymerization systems considerably more costly to install and operate.

It is known to polymerize styrene monomer in the presence of dissolved diene rubbers in stirred tank reactors to form polyblends of styrene grafted rubber and polystyrene. As the styrene polymerizes to polystyrene it forms a monomer-polymer solution as a separate phase in the monomer-rubber solution phase. Some of the polystyrene grafts onto the rubber forming a grafted rubber in the monomer-rubber phase.

The monomer-polymer phase increases in volume with conversion of the styrene monomer and as that volume becomes larger than the monomer-rubber phase then an inversion occurs with the monomer-rubber phase dispersing as monomer-rubber droplets in the monomer-polymer phase. The grafted rubber exists at the interface of the droplet acting as a surfactant helping disperse and stabilizing the monomer-rubber droplets. The agitation of the stirred reactor aids the inversion phenomenon and helps size the monomer-rubber droplets. This agitation must be sufficient to both create shearing agitation and produce agitation throughout the entire polymerizing mixture to insure homogeneity both as to the mixture and its temperature. The agitation must insure sufficient shearing action to size and disperse the monomer-rubber globules. Such agitation will vary with the size of the vessel, the type of agitator and viscosity of the mixture.

Stein et.al. in U.S. Pat. No. 2,862,906 disclose a process for mass polymerizing polystyrene in the presence of diene rubber in a first stirred tank reactor up through the phase inversion of the rubber and then suspending the partially polymerized syrup or prepolymer in water in a second reactor and completing the polymerization realizing excellent heat control and producing a polyblend in the form of beads. Such processes are used commercially but present the problem of batch operations having quality control problems and high operational costs.

The prepolymerization step is very important in providing a polyblend with superior physical properties of molding and sheet products. Here the impact strength or toughness and gloss of the fabricated article are of primary importance. Both impact strength and gloss are dependent on the rubber particle properties and the amount used in the polyblend. Small particles give good gloss but low toughness whereas large particles give good toughness but low gloss. A balance is realized in a optimum product by controlling the particle size and the amount of grafted styrene within the particle. These monomer-rubber particles are formed in the first reactor and become stabilized by grafting. When the prepolymer is suspended in water they then polymerize progressively under uniform temperatures with the matrix phase in the suspended bead much as in a mass process.

The monomer-rubber particles contain grafted rubber but also occluded polymer formed by polymerization of the monomer in the droplet as free polymer. The amount of free and grafted polymer can vary in the rubber droplets which form discrete rubber particles as all of the monomer is polymerized, said grafted and occluded polymer being present in the rubber particle in a preferred amount of about 1 to 5 parts for each part of rubber.

The monomer-rubber droplet then polymerizes as a separate system in the monomer-polymer phase each developing a progressively larger polymer phase as conversion of the monomer is carried out. The occluded polymer in the rubber particle is an important feature of the morphology of the particle. Some of the rubber is grafted which stabilizes its dispersion in the polyblend matrix. Some of the polymer being formed crosslinks the rubber particle insuring its particle size integrity so important to physical properties. The rest of the occluded polymer serves as a filler or extender for the rubber particle giving it a higher efficiency as a rubber phase in toughening polyblends particularly those of the polystyrene family of polymers such as impact polystyrene and ABS polyblends.

Because of the critical nature of the rubber particle phase, it must be formed correctly in the first prepolymerization reactor as described and then that structure or morphology must be maintained in any further polymerization system used to complete the polymerization. The batch mass-suspension system of Stein, et.al. preserves the rubber structure using a suspension reaction system to gradually polymerize the remaining monomers. The prepoly syrup is generally suspended at 10 to 40% conversion and gradually polymerized to full conversion as beads. Here the monomer polymerizing in the monomer-rubber phase and the monomer-polymer phase are polymerizing at the same rate and monomer concentrations in each phase remain about the same with no extraction of critical monomer from the rubber phase to lower its occluded polymer content.

In developing a continuous process for polymerizing monomer-rubber solutions one must consider the same process and product requirements to producing acceptable polyblends. It has been found that continuous mass polymerization in a stirred tank reactor can be run under steady-state polymerization conditions forming a dispersed rubber phase with a controlled feed of monomer-rubber solution and controlled withdrawal of partially polymerized syrup. The effluent of the first continuous stirred tank reactor can then be fed continuously to a staged isobaric stirred reactor of this invention to further the polymerization yet preserve the morphology of the rubber phase particles. Both reactors are run at variable fillage so that products of varying and predetermined molecular weight can be made at any predetermined rate.

The stated isobaric reactor operates under substantially linear flow with progressive polymerization from the first to last stage. The prepolymerization syrup is fed to the first stage of the staged isobaric stirred reactor (SISR) and polymerizes under conversion levels only slightly higher than the continuous stirred tank reactor (CSTR). This is necessary to insure that the rubber phase maintains its morphology. If the prepolymerization syrup at 10 to 40% conversion were fed to a second continuous stirred tank reactor operating at 75% conversion there would be a substantial loss of monomer from the monomer-rubber droplets lowering the possible amounts of occluded polymer to be formed in the rubber particle. Prior art processes have overcome this problem by using a series of separated tower reactors each operating at a slightly higher conversion to progressively polymerize the monomer-polymer solution. Ruffing, et.al. in U.S. Pat. No. 3,243,481 also uses a series of separated tower reactors to progressively polymerize polyblends containing rubber. Such systems have the inherent cost and quality control problems described earlier.

The SISR reactor of the present invention, however, provides staged polymerization in one novel reactor operating under constant but variable fillage and isobaric boiling conditions. The SISR provides means to remove monomer from all stages simultaneously allowing each stage to operate under controlled temperatures. Means to condense said vapors and bring them back into the first stages where the highest polyrates are realized are provided for highly efficient conversion of monomers per unit volume of reactor. The SISR provides shearing agitation to insure the uniformity of the viscous polymerizing mixture in each state maintaining the morphology of the rubber particles.

Furusowa, et.al. in U.S. Pat. No. 3,486,865 disclose a continuous polymerization apparatus which is compartmentalized by transverse partitions with the reactor operating in a vertical configuration with plug flow through perforations in the partitions. The apparatus differs from the present invention since it does not provide open individual compartments each designed to provide variable fillage under evaporative conditions at isobaric conditions giving individual temperature control for each compartment and providing highly efficient polymerization rates per unit volume of reactor. The Furusawa reactor is a heated reactor for polymerizing condensation polymers and would have great difficulty in handling the great exotherms in polymerizing addition polymers. The novel reactor of the present invention uses evaporative cooling to cool and control temperatures and has no operational need for a heating jacket except for starting up or shutting down the process.

Yamashita, et.al. in U.S. Pat. No. 3,498,754 disclose a continuous polycondensation apparatus having overflow partitions wherein viscous melts are moved by agitating vanes through opening at the top of the overflow partitions. This apparatus is essentially a stirred cascade type and presents the problem of heat transfer and longer dwell time giving low efficiencies per unit volume. The reactor is designed for condensation reactions wherein the reactants are heated and not for addition polymerization wherein great amounts of heat have to be removed by evaporative cooling and return of monomers to the early stages wherein high polyrates and high polymerization efficiencies per unit volume of reactor are obtained.

SUMMARY OF THE INVENTION

The present invention relates to a continuous polymerization reactor for the production of polymers comprising:

A continuous staged, isobaric, stirred reactor apparatus adapted for operation in a generally horizontal configuration of partial fillage levels with evaporative cooling and further adapted for the continuous exothermic polymerization of monomers in a fluid reaction media under substantially linear flow conditions, said apparatus comprising:

a. a generally cylindrical, enclosed vessel, adapted for operation in a generally horizontal configuration with input and output ports at opposite end regions thereof, b. at least one shaft extending generally longitudinally through said vessel and adapted for axial rotational movements relative thereto, c. at least one baffle-like member, each such member (1) extending generally transversely across the interior of said vessel, (2) adapted to partition said vessel internally into staged chambers, (3) being longitudinally fixed relative to said vessel and/or said shaft means, (4) defining at least during operation of said apparatus, radial clearance with said vessel and between adjacent chambers defining a top aperture being adapted for passage of vapor and a bottom aperture being adapted for passage of polymerizing fluid, d. agitator blades functionally associated with said shaft, positioned in each of said staged chambers, and adapted to maintain polymerizing fluid partially filling each of said chambers during operation of said apparatus in horizontal configuration in a generally uniform and homogeneous condition,
e. drive means functionally associated with said shaft and adapted to rotatably drive same during operation of said apparatus,
f. vapor removal means functionally associated with the upper portion of said vessel and adapted to remove vapors evolved from fluid in said vessel from each of said chambers,
g. condition sensing means adapted to measure temperature, and/or pressure in at least one of said chambers during operation of said apparatus and to convert the so measured value(s) into at least one condition signal representative thereof,
h. set point means adapted to generate a signal representative of a predetermined pressure and/or temperature desired in a predetermined one of said chambers,
i. control means interconnected with a condenser means, said condition sensing means and said set point means and adapted to regulate the rate at which said condenser means condenses said vapors such that the temperature and/or pressure in at least one of said chambers is maintained within operating limits at a predetermined temperature and/or pressure, and
j. flow regulating means functionally associated with said input and/or output ports and adapted to maintain the average level of fluid in said vessel in each of said staged chambers within predetermined limits.

The polymerization of monomers to polymers is carried out in the reactor of this invention so as to progressively polymerize the monomer-polymer fluid by multistage substantially linear flow polymerization. All said stages operating with shearing agitation and common evaporation vapor phase cooling under isobaric conditions in said reactor, providing each said stage with steady state polymerization at controlled temperature and interfacial liquid contact stage to stage establishing a hydraulic pressure gradient from the first stage downstream to the final stage causing substantially linear flow through said reactor, all said stages operating at predetermined conversion levels producing a composite polymer in said reactor having a predetermined molecular weight distribution and average molecular weight maintaining the structural integrity of said dispersed rubber particle, said reactor producing a monomer-polymer-rubber mixture having a total polymer solids content being determined by said multistage steady state polymerization and evaporation of said monomers.

The reactor operates under controlled isobaric conditions. For the range of temperature normally of interest for ethylenically unsaturated monomers, e.g. styrene polymerization, the operating pressure will range from 7 to 29 psia. The styrene reaction is exothermic, and cooling is provided by vaporization of a part of the monomer from the reacting mass. The mass is in a boiling condition, and temperature is determined by the natural relationship between vapor pressure and boiling point. This relationship is also a function of the relative amounts of polymer, monomer, and other substances (e.g. dissolved rubber, solvents, and diverse impurities found in the raw materials.) Since, as material progresses through this reactor, the amount of polymer continuously increases and the amount of monomer corresponding decreases via polymerization, and monomer content further decreases due to vaporization loss, the temperature progressively increases from inlet to outlet compartments.

To accommodate the natural swell of the boiling mass, and to provide space for vapor disengagement, the reactor is run at substantially constant fillage of about 10 to 90% preferably 40 to 60% of its volume.

Vapor passes out of the reactor to an external condenser where it is condensed and may also be subcooled. This condensate may then be handled in several ways, for example:

1. If the reactor of this invention is preceded by another reactor in a multi-reactor train, the condensate may be returned to a preceding reactor.
2. The condensate may be returned to the first stage or stages of the reactor of this invention, wherein it is reheated by condensation of a fraction of the previously evolved vapors and mixed with other incoming feed materials.

In the staged reactor, each stage is well mixed, and the reaction mass is quite homogeneous within itself. The baffles which separate the stages discourage interchange of material between stages. The finite clearance between baffle and vessel does permit some limited interchange, and also permits the necessary forwarding of material through the stages from reactor inlet to outlet giving substantially linear flow.

In a staged reactor as here described, the first stage is at a relatively low conversion level, since it is being continuously fed by unreacted monomer and low conversion prepolymerizing liquid. Hence, the rate of conversion in this compartment is relatively high.

In each succeeding stage, the conversion level is higher than in the preceding one, which tends to lower the rate of conversion. Offsetting this lower rate, however, are the facts that the temprature is higher, and that monomer is being vaporized out of the mass. Thus, the total conversion obtained per unit reactor volume is higher than that which could be obtained in a single chamber reactor producing an equal final conversion level at equal temperature.

Clearance between the baffle and cylindrical vessel wall may be from 0.5 to 10% of vessel radius, the larger values being appropriate to the high conversion end of the reactor where viscosity is at maximum. Stage to stage forward flow of the reacting fluid is through this clearance, and vapor from the reacting fluid also counterflows through the same clearance, above the surface level of the mass.

DESCRIPTION OF THE DRAWINGS

FIG. 3 is a view in section on the longitudinal axis of a continuous staged isobaric stirred reactor as one embodiment of the invention.

FIG. 4 is a view in section on a transverse plane of the apparatus shown in FIG. 3, along line 4—4.

FIG. 5 is a view in section of agitator assembly having straight agitator blades as an embodiment of this invention.

FIG. 6 is a view in section of an agitator assembly having curved agitator blades as one embodiment of this invention.

FIG. 7 is a view in section of an agitator assembly having bent agitator blades as one embodiment of this invention.

FIGS. 8 and 9 are views in section on a transverse plane of an embodiment of the apparatus wherein baffles are shown fixed to the wall of the vessel instead of the shaft.

DESCRIPTION OF THE PREFERRED EMBODIMENTS

Figure 1:
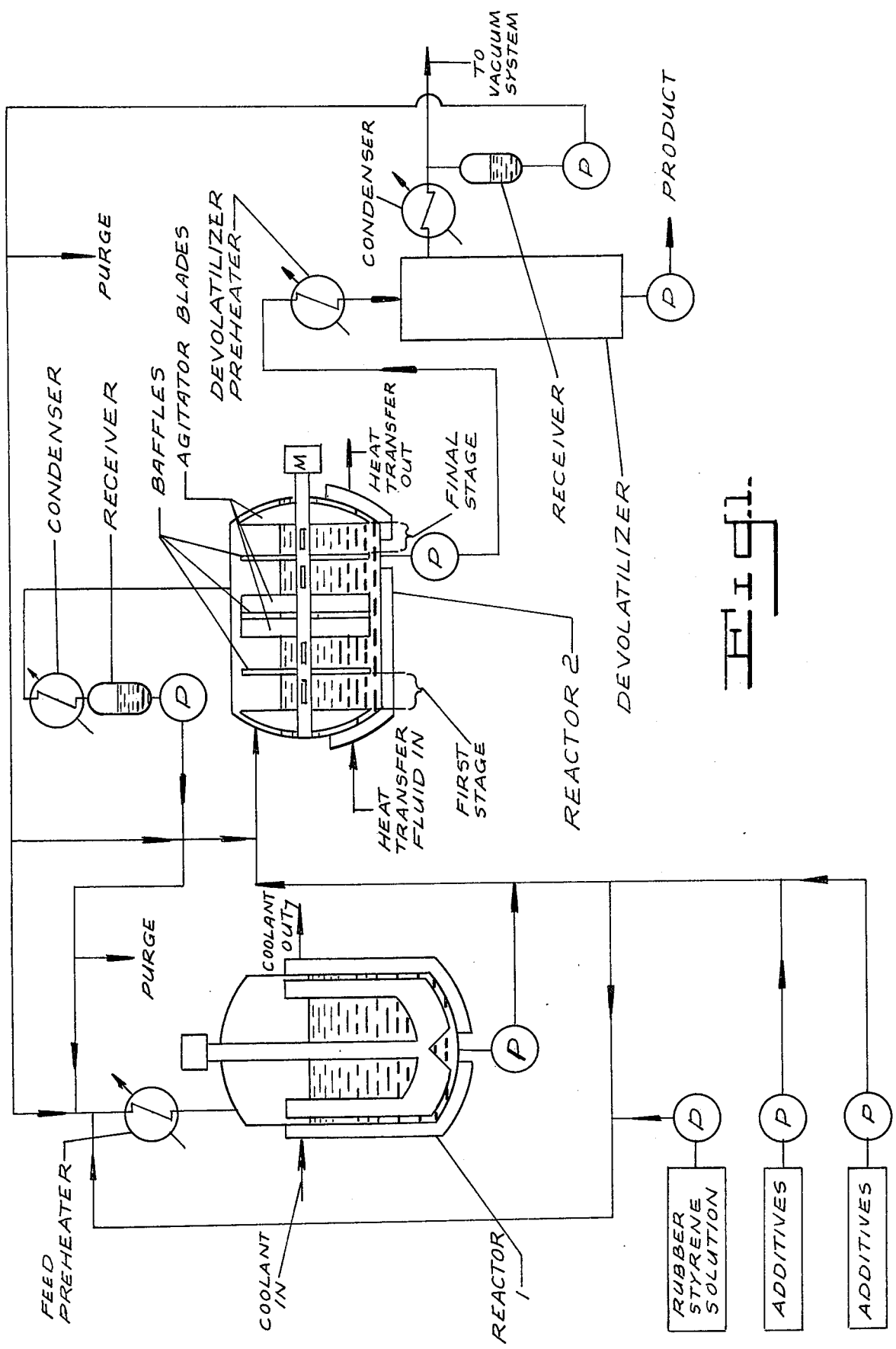
FIG. 1 is a diagrammatic view of an apparatus assembly incorporating a continuous staged isobaric stirred rector of this invention as Reactor 2, in a continuous polymerization apparatus assembly. Reactor 2 is one suitable embodiment of the apparatus of the present invention.

In FIG. 3, 10 is a vessel equipped with an input port, 11 and output port 12. Shaft 13 extends longitudinally through said vessel and is supported by stuffing box 14. Baffle 15 extends generally transversely across the interior of said vessel adapted for axial rotation relative thereto and positioned to partition said vessel internally into staged-chambers 16 being longitudinally fixed relative to said shaft means. Baffle 15 defines top aperture 17 and bottom aperture 18 between adjacent staged chambers and the vessel interior wall. The top aperture being adapted for passage of vapors and the bottom aperture adapted for passage of fluid. Agitator blades 19 associated with said agitator shaft and positioned in said staged chambers are adapted to maintain the fluid partially filling said vessel in each of said staged chambers in homogeneous condition. Said shaft is coupled with said variable speed regulator 20 and drive motor 21. Output port pump 22 delivers flow of fluid from said output port and input port pump 23 deliver fluids to said input port. Vapor output port 24 delivers vapors to condenser 25 and condensed vapors to receiver 26 for fluid feed to said inlet port. Temperature probe 27 is associated with a temperature controller shown in FIG. 2 and level transducer 28 is associated with level controller of FIG. 2. Heating or cooling jacket 29 encases said vessel for temperature control of said reactor. FIG. 4, shows vessel 10, shaft 13, baffle 15, top aperture 17 and bottom aperture 18, agitator blades 19 and heating or cooling jacket 29. FIG. 5 shows straight agitator blades 30. FIG. 6 shows curved blades 31 and FIG. 7 shows bent blades 32. FIG. 8 shows a baffle 33 fixed to the interior wall of vessel 10 having a close tolerance opening to accommodate shaft 13. Top aperture 40 and bottom aperture 35 are shown as sized fixed apertures between the baffle 33 and the interior wall of vessel 10. FIG. 9 shows baffle 36 fixed to the interior wall of vessel 10 having a close tolerance opening to accommodate shaft 13. Top aperture 37 is shown as sized fixed aperture in baffle 36 whereas bottom aperture 38 is shown as an adjustable aperture having a gate 39 that can be controlled by mechanical means through the vessel wall to adjust the aperture as to its size and the flow of reaction media. The top aperture can also have such construction as an embodiment within the scope of the present invention.

Further design details of the novel staged isobaric stirred reactor are considered below.

Aperture clearance between rotating baffles and the vessel wall may be from 0.5 to 10% of vessel radius, the larger values being appropriate to the high conversion end of the reactor where viscosity is at maximum. Stage to stage forward flow of the reacting fluid is through this clearance, and vapor from the reacting mass also counterflows through the same clearance, above the surface level of the mass. To assure that the vapor channel is not obstructed by viscous material clinging to the baffle and wall, a "dome" 34 can be located in the top of the vessel above each baffle. This embodiment may be a pipe cap welded into a hole in top of vessel, or a flanged nozzle for mounting of a sight glass for observing the reactor interior.

The preferred configuration of agitator blades within a single chamber is indicated in FIG. 3. Each blade is a flat plate or a backwardly bent or curved plate extending from the shaft toward the wall with clearances consistent with the adjacent baffle. One pair mounted at 180° to each other on the shaft sweeps one-half the axial length of the staged chamber. A second similar pair, mounted at 90° to the first, sweeps the other half of the chamber length. Backwardly bent or curved blades are particularly recommended in the final chamber, as they assist in pushing the viscous material into the outlet pipe.

Blades on opposite sides of a baffle should be in the same angular orientation on the shaft. Because of the motion of the blades, there exists a small pressure increase just ahead of the blade and a small decrease just behind it. By having blades oriented alike there is a tendency to pressure equalization on the two sides of the baffle, which will discourage unwanted interchamber flow through the baffle apertures. The outside corner of each blade abutting a baffle can be cut off to reduce pressure build-up adjacent to the baffle, for reason above mentioned. The exact amount to be cut off can be varied. A 45° cut, with sides equal to 5% of vessel radius, is preferred. The inside corners of the agitator blades may also be coped as shown in FIG. 3 to provide clearances for a temperature probe if desired.

Commercial reactors built to the design here disclosed can be fabricated with a jacket or heat tracing over full cylinder and ends. High temperature heating medium will provide for startup preheating, and for melt out after a runaway reaction. Jacket heat is not needed during normal operation as reactor temperature is controlled by evaporative cooling.

The principal advantages of the multi-staged design for polymer manufacture are: (1) its ability, under like temperature conditions, to produce more polymer per unit volume of reactor, and (2) a reduction of agitator power input by reason of a lower average viscosity of the reaction mass, and (3) a decreased likelihood of fouling the vapor line and condenser with entrained polymer, by reason of the fact that the vapor outlet is from the low conversion first compartment, where mass swell is least because of lowest viscosity.

The reactor vessel can have a length to diameter-ratio (L/D) of from 0.8 to 15. However, in the case of a multi-staged reactor vessel providing substantially linear flow, it is generally preferred to have a generally elongated generally cylindrical vessel having a L/D ratio of greater than 1 up to 15.

The input port is generally conveying lower viscosity fluids and a pipe having sufficient diameter versus length to provide flow without large back pressures is preferred. Spray nozzles can be used on the outlet end allowing better cooling of vapor removed through the vapor outlet port and the knocking out of any foamed liquids finding their way to the vapor outlet port. The output port should have a large diameter and short length to facilitate the removal of the viscous monomer-polymer liquids consistent with the viscous flow desired from the output port in operation. Large reactors with large through-put rates should have output ports consistent with such flow requirements. The opening of the output port attached to the final stage of the reactor vessel is generally positioned at a downstream position in the bottom of the final stage. Other positions are functional, consistent with feed levels of the liquids in the reactor, insuring the withdrawal of the viscous liquids from the final stage. The preferred location is shown in FIG. 3 maximizing the hydraulic head for removal of viscous liquids. Flange mans are shown in FIG. 3 to provide for attachment of the output port pump.

The shaft adapted for axial rotational movements preferably has length and diameter dimensions that satisfy the mechanical requirements of minimized deflection along its length and run-out in the bearings. Central bearings can be used to support the shaft if the deflection is excessive. It can vary in cross-sectional dimensions along its length to accommodate the loading of attached baffles and agitator blades. The stuffing box means is designed to satisfy bearing and sealing requirements for the reactor vessel. The seals can consist of mechanical seals or visco-seals, not shown, or the like commonly used in such construction. The bearings can be ball, roller or journal bearings, not shown as generally used in such construction.

The baffles shown in FIG. 3 are plate-like circular shaped members attached to the shaft for rotational movement. The design of such rotating baffles can be varied to minimize deflection taking the shape of discs having wider root dimensions nearer the shaft for added rigidity. The baffles can be attached to the agitator blades and provided with gussets (not shown) to minimize the deflection of the baffles, for example. The baffles can as another embodiment be fixed at the vessel walls as stationary baffles with a close-tolerance central opening provided for the shaft and peripheral clearances to provide apertures. Design can provide for adjustable clearances by adjustable gates for the bottom and top apertures. Other apertures can be designed for stationary baffles such as openings of varying sizes and shapes sufficient in area to allow the necessary flow of fluid in bottom apertures and vapors in top apertures. FIGS. 8 and 9 are cross-sectional views of the reactor vessel showing stationary baffles with the apertures described.

Figure 2:
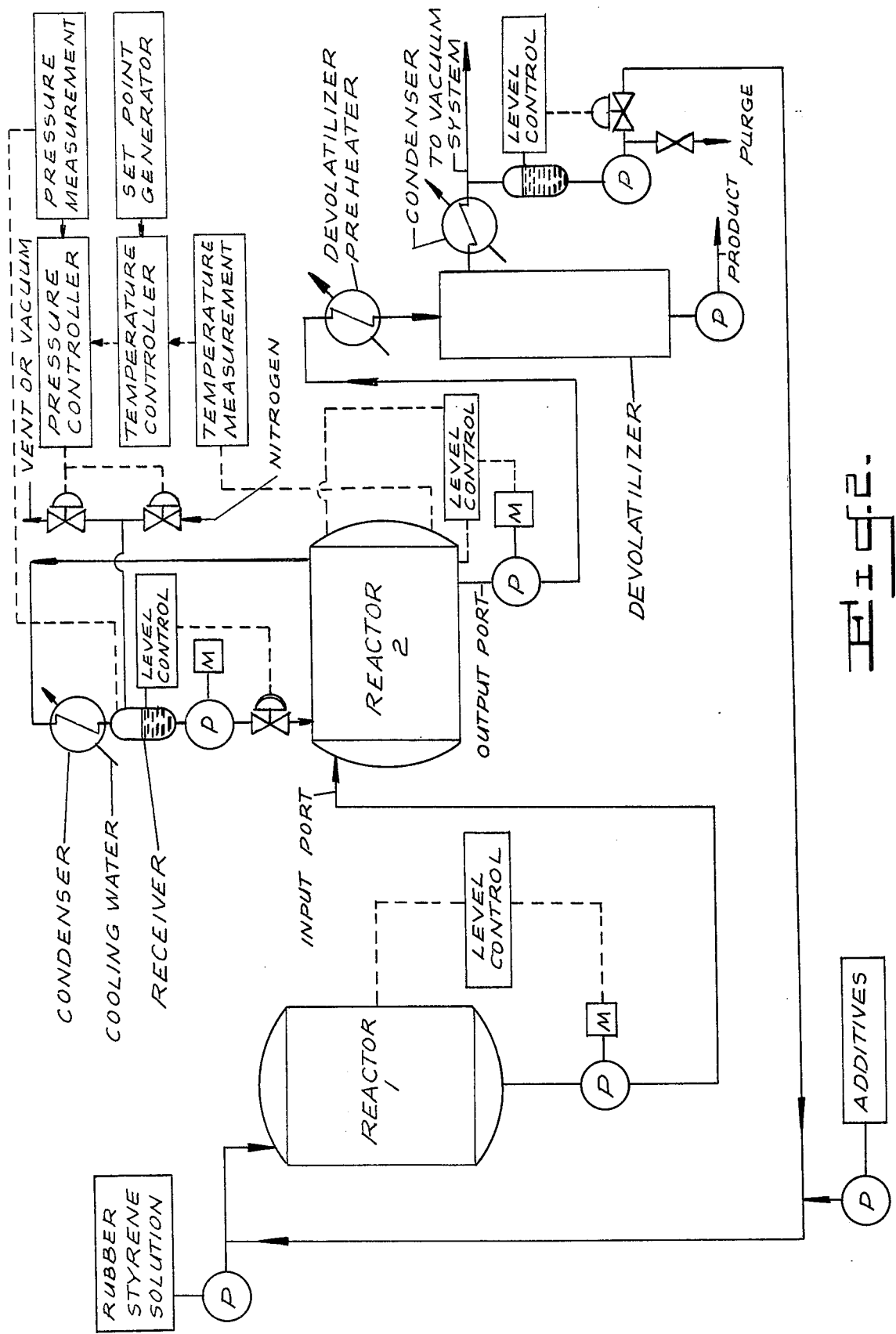
FIG. 2 is a diagrammatic view of one preferred assembly of control means for Reactor 2 in a continuous polymerization apparatus assembly. A first control means for regulating the flow rate through Reactor 2 by level control means and a second control means for regulating the temperature of Reactor 2 by pressure controlling means.

The staged chambers shown in FIGS. 2 and 3 can vary in number generaly ranging from 2 to 15. Preferably 3 to 10 stages are used to provide substantial linear flow consistent with the costs of construction. Linear flow can be more readily provided with a greater number of stages. A staged isobaric stirred reactor of the present invention provides substantially linear flow in that the net flow from stage to stage is forward or linear. Back-mixing between adjacent stages is reduced by the baffles providing a net linear flow defined as substantially linear flow in the present invention. The conversion in each succeding stage of the reactor has been found to be higher showing that the net flow from stage to stage is forward or linear. Generally the first and last stage are designed larger to accommodate the vapor outlet port and the output port. Considering ($n$) stages an evenly divided staged reactor would provide each stage with a fractional part ($1/n$) volume of the reactor vessel. Generally the first and last stages can occupy up to fractional 0.5 part of the total reactor volume with the rest of the reactor volume divided into stages of equal volume as needed for linear flow. Each stage runs at a higher conversion level, hence a higher temperature with the last stage being highest. The temperature profile needed to produce a given molecular weight and molecular weight distribution then determines the number of stages as well as the requirement of linear flow.

The apertures are defined by the clearances between the baffles and the walls of the vessel in the case of rotating baffles as described above. The apertures for stationary baffles can take the form described above.

A general description of the preferred agitator blades has been discussed above. Other configurations can be used. Pairs of opposed blades at 180° are shown in FIG. 3 mounted on each side of a baffle. Each pair is mounted at the same angular orientation with the shaft. Although this is the preferred orientation, the blades would be functional at different angles of orientation with one pair being at e.g. 45° to the first. The pairs in a given stage are shown at orientation of 90° to each other. This orientation could vary, e.g. being 45°. Each pair of opposed blades is attached at 180° to each other. Such blades could vary in orientation, e.g. 135°. Two pairs of opposed blades are shown for each stage. Greater numbers of pairs of opposed blades could be used, e.g. 3 to 4 pairs. Those skilled in the art recognize that good design requires mechanical balance and symmetry in an angitator means, hence the orientation of the blades as shown on the preferred embodiment provides this balance and variations from this configuration can be used but are not preferred. The agitator blades cause a certain displacement of the polymerizing fluid in the direction of rotation of the agitating blades. Too many blades at one axial location can cause excessive displacement, hence a preferred number are shown as one pair for each axial location. The drive shaft and agitator blades can be rotated at speeds of 1 to 100 rpm preferably 5 to 50 rpm most preferably 10 to 30 rpm. The viscosity of the polymerizing fluid can have viscosities as high as 1 million centipoise. The mechanical construction of the shaft and blades must be sufficiently strong to rotate at the speeds indicated and provide shearing agitation to highly viscous syrups having the viscosities described.

A preferred method of control of the second reaction zone such as reactor 2 is illustrated in FIG. 2 of the drawing. As illustrated, the variable controlled is the temperature within the final stage of reactor 2. The control system shown involves sensing the temperature in the liquid phase in the final stage of reactor 2. The condition signal so generated is used as the measurement input to a conventional proportional-reset temperature controller having provisions for a manual or externally generated temperature set point means. The temperature controller output is used as the set point for a proportional pressure controller in a conventional cascade control system. Measured pressure input to the pressure controller is generated by a pressure transmitter which senses pressure in the reactor vapor phase. The pressure sensing point may conveniently be located as illustrated downstream of the vapor condenser to minimize plugging of the sensing line. Output of the pressure controller actuates two pressure control valves which are connected to the vapor space of the recycled monomer receiver. One of these valves supplies pressurized nitrogen from an external source and the other vents to atmosphere or to an external evacuated space. By so adjusting the pressure above the condensed monomer in the receiver the temperature of the final stage in reactor 2 is very closely and rapidly controlled to a preselected desired value. The temperature in each stage rapidly achieves an equilibrium value based on the reactor pressure and the material composition of the polymerizing mixture in each stage. As shown in FIG. 2 the liquid level in the condensed monomer receiver is utilized to control the recycle rate of the liquid contents of said receiver to reactor 2 by means of the valve shown. Such recycle rate is controlled by the liquid level in the receiver which in turn is controlled by the rate of withdrawal of the vaporized monomer from reactor 2 controlled as above outlined. As illustrated in FIG. 1, this condensed monomer may be optionally returned to reactor 1.

The preferred staged isobaric reactor apparatus shown in FIG. 3 having evaporative cooling can have other configurations within the scope and spirit of the present invention. For example, the vapor removal means associated with the upper portion of the vessel can be designed to have individual vapor removal ports functionally associated with each chamber when stationary baffles attached to the housing are used and only bottom apertures are provided. The individual ports would be associated with each upper wall portion of said vessel forming each chamber. Said ports would have a common manifold to remove the vapors being interconnected with a condenser and receiver means as shown in FIG. 3.

Another configuration of a staged isobaric stirred reactor apparatus having evaporative cooling is an apparatus having a reflux condensing means associated with the upper portion of the vessel wherein the vapors are not removed but refluxed internally. The reflux condensing means can be a cooled upper portion of said vessel interior wall associated with a cooling jacket having inlet and outlet ports for the flow of coolant through the jacket. The rate of reflux of said vapor condensate being controlled by the pressure in the vessel wherein a valved vapor vent means associated with the upper portion of the vessel, a condition sensing means, a set point means and a control means, control the pressure to some predetermined value relative to the temperature of the reacting media. The reflux condensing means can be at least one reflux condenser associated with the upper portion of the vessel which condenses the vapors returning them directly to the vessel, preferably to the first stages. In a configuration having fixed baffles without upper apertures, a reflux condenser can be provided for each stage with all condensers having a common valved vent for control of pressure.

The utilization of the process in an overall production process for high impact strength polyalkenyl aromatic polyblends is shown in FIG. 1. The polymer, dispersed rubber and monomer mixture called the second mixture comprises the liquid phase effluent from reactor 2. Said second mixture having a polymeric solids content of from about 50 to about 90% by weight is withdrawn therefrom by suitable means such as a gear pump and passed to a heating and devolatilization zone or zones.

In FIG. 1 there is illustrated one zone of devolatilization which can be operated at pressures below atmospheric, or degrees of vacuum. However, the process can be operated by the use of two or multiple zones of devolatilization as desired. In the process outlined the vaporized alkenyl aromatic monomers as well as low oligomers thereof are removed from the first devolatilization zone, condensed and passed to a receiver. From the receiver a stream of the condensed monomers and oligomers can be recycled to reactor 2 as shown, or, if preferred, to reactor 1. Likewise, the monomers and oligomers vaporized in a second devolatilization zone generally operated at somewhat lower pressure than the first are withdrawn, condensed and passed to a receiver. From this receiver a stream of condensed monomers and oligomers can also be recycled to either reactor 1 or 2 as shown. Preferably, the oligomers vaporized in either devolatilization zone can be separated from the vaporized monomer by distillation and separately recycled to a reaction zone or purged from the process.

In the production of certain of the desired polymers it has generally been found advantageous to add certain high boiling organic compounds to the polymers produced and the addition is preferably made during polymerization. These additives include internal lubricants such as mineral oil or other heavy oil and mold release agents such as fatty acids, fatty acid esters or salts and waxes. These additions can be conveniently made to either reaction zone but are preferably made to reactor 2 as shown in FIG. 1 by means of the multiple metering pumps there shown. Making such additions to reactor 2 facilitates changing the polymer product mix without shutting down or cleaning reactor 1. In any event, it is necessary for economic reasons to be able to recover the relatively high boiling additives and recycle them to the process. Such additives are generally recycled to either zone of reaction together with the oligomers in a stream of condensed monomer when such oligomers have been concentrated from the vaporized monomers or alternatively, with the condensed and recycled monomer streams. In the process it is preferred that the oligomers and additives be concentrated in a stream of condensed monomer rich in oligomers and additives and that such stream be recycled to the second reactor while a separate stream of condensed monomer substantially free of oligomers and additives be recycled to the first reactor from the devolatilization zone or zones.

When operating in the manner described above, the proper control of a first reactor and a second reactor both comprising reactors of the variable fillage type affords one the extremely useful advantage of ability to produce polymers of specific physical properties and molecular weight distribution over a range of capacities of from as low as 30% to as high as 90% of design capacity for the single production facility described. This flexibility in useful capacity is highly desirable to afford ready response to changes in market demand for total polymers or in the market percentage for various polymers produced in such a production facility.

Reviewing the elements comprising the present invention a generally horizontal and cylindrical enclosed reactor vessel is illustrated as vessel 10 in FIG. 3 a shaft means as shaft 13 in FIG. 3; a baffle-like member as baffle 15 in FIG. 3; a agitator blade means as agitator blade 19 in FIG. 3; a drive means as drive motor 21 in FIG. 3; a vapor removal comprising a vapor outlet port 24, a condenser 25, a receiver 26 all interconnected with a pipe means to said reactor and associated with a control means for regulating the quantity of vapor withdrawn from said vessel 10; a condition sensing means as temperature probe 27 in FIG. 3 interconnected with temperature measurement and controller in FIG. 2; a set point means as shown in FIG. 2 as a set point generator; a control means as shown in FIG. 2 having (1) a temperature controller, (2) a pressure measurement and (3) a pressure controller; interconnected with a condenser adapted to regulate the rate at which vapors are withdrawn and condensed such that the pressure and temperature of said stage chambers during operation of said apparatus in horizontal configuration is maintained within operating limits at a predetermined temperature and pressure; a flow regulating means shown in FIG. 2 showing (1) a level controller, (2) a motor and (3) a pump interconnected with an output port with FIG. 3 further detailing the individual elements with the level controller as a level transducer 28 and the pump as output port pump 22.

In order to illustrate the operation of the continuous isobaric staged reactor apparatus of this invention as well as the benefits which are derived from its use, the following examples are included.

EXAMPLE 1

A monomer composition consisting of 8 parts by weight of stereospecific polybutadiene rubber in 92 parts by weight of styrene monomer is prepared by agitating the mixture at 40°C., for 8 hours. The rubber used contains approximately 35% cis-1,4 structure; approximately 55% trans-1,4 structure, and approximately 10% vinyl-1,2 structure having a Mooney viscosity of the rubber (ML-4, 212°F.) at 55. To the above monomer composition is added 0.5 parts of white mineral oil, 0.1 part by weight of octadecyl 3-(3',5'-di-tert-butyl-4-hydroxyphenyl) propionate and 40 parts by weight of recycled styrene monomer. This monomer composition is fed continuously at approximately 145 lbs./hr. to a 100-gal. anchor-agitated initial reactor operated at approximately 50% fillage and 124°C., under 5 psig. nitrogen pressure.

The agitator is approximately 31 inches wide and turns at 65 rpm. A first mixture containing approximately 18% polystyrene is pumped from the above reactor at a continuous rate such as to maintain essentially constant fillage therein and flows as a fluid reaction media to the inlet of the second reactor, a staged isobaric stirred reactor of this invention. The second reactor has approximately a 50 gal. capacity and operates at about 40% fillage.

The reactor is about 53 inches long. The agitator consists of a horizontal shaft on which are fixed a series of paddles about 2 inches wide alternating at right angles to one another in a manner similar to that shown in FIG. 1. Along the shaft and rotating with it are four circular baffles with an average radial wall clearance of about three-eighths inch rotating at 15 rpm. These baffles are positioned to divide the reactor into five stages of approximately equal volume. The pressure in this reactor is maintained at approximately 20 psia.

The polymerizing fluid in the final stage is maintained at about 166°C., and contains about 62% polystyrene. Styrene vapor evaporated from the second reactor is condensed and the condensate is returned to the first compartment. The second mixture is pumped continuously from the final stage at a rate to maintain essentially constant fillage in the second reactor and is delivered to the inlet of the devolatilizer preheater. The second mixture exits from the preheater at approximately 240°C., and enters a devolatilizer chamber maintained at 50 torr. Second mixture volatile vapors exiting the devolatilizer chamber are condensed and recycled to the first reactor preheater feed system. Approximately 3 lbs./hr. of the condensed devolatilized vapors are withdrawn as purge. The devolatilized melt is fed from the devolatilizer chamber to an extruder which forms it into a plurality of strands which are then cooled and cut into pellets. The combined polymer has a Staudinger molecular weight of about 51,000 and a dispersion index about 3.1.

| Typical Properties | |
|---|---|
| Izod Impact ½" × ½" bar 73°F. (ft.lb./in.) | 1.3 |
| Tensile strength at yield (lb./in.) | 3800 |
| Tensile strength at fail (lb./in.) | 3750 |
| Tensile elongation at fail (%) | 25 |
| Swelling index | 9 |
| Parts graft and occlusions/rubber | 1.43:1 |
| Rubber particle size (microns) | 1.5 |

It is to be noted that the first reactor was run at 124°C., and the second reactor at about 166°C., with the first reactor making a higher average molecular weight first polymer and the second reactor making a lower average molecular weight second polymer. The preheater of the separator step was run at 240°C., causing crosslinking of the rubber phase giving the rubber phase a swelling index 9. Some low molecular polymer may be formed during the heating and separation steps. The combined polymer of the rigid phase is found to have an average molecular weight of about 51,000 Staudinger and a dispersion index of 3.1 representative of the molecular weight distribution. The rubber particles have a desirable morphology having a particle size of 1.5 microns and having a graft and occlusion level to rubber ratio of 1.43 to 1.0.

EXAMPLE 2

Monomer Composition Having Lower Rubber Content

Using the apparatus and procedure of Example 1, except where noted, the process was operated as follows:

a. The feed monomer composition contains about 3.5 parts of rubber and 96.5 parts styrene,
b. The first mixture stream from the 100 gallon reactor contains approximately 19% polystyrene, operating at steady state polymerization,
c. The second reactor run at 167°C., and 19.3 psia.,
d. The second mixture from the second reactor contains approximately 65% polystyrene operating at steady state polymerization,
e. The second mixture from the devolatilizer preheater is approximately 230°C.,
f. The polymer solids were separated from the second mixture volatile phase as a polyblend.

| Typical Properties of the Polyblend | |
|---|---|
| Izod Impact ½" × ½" bar 73°F. (ft.lb./in.) | .75 |
| Tensile strength at yield (lb./in.$^2$) | 5000 |
| Tensile strength at fail (lb./in.$^2$) | 4700 |
| Tensile Elongation at fail | 42 |
| Swelling index of rubber phase | 12 |

-continued

Typical Properties of the Polyblend

| | |
|---|---|
| Rigid phase combined polymer Staudinger molecular weight | 52,000 |
| Rigid phase polymer dispersion index | 2.8 |
| Rubber particle size (microns) | 1.8 |
| Parts graft and occlusions/parts rubber | 1.44 to 1.0 |

It is to be noted that the rubber level charged was lower being 3.5% versus 8.0% giving a lower impact strength of 0.75 ft.lbs./in. The preheater was run 230°C., versus 240°C., and the swelling index was higher being 12 versus 9 at 240°C., showing less crosslinking of the rubber phase as the temperature is lowered. A lower level of rubber gives a lower elongation at fail being 42 versus 62. Tensile strength at yield and fail increases because the filler content of the rubber decreases. The dispersion index was found to be 2.8 and the average molecular weight to be 52,000 Staudinger showing a slightly narrower molecular weight distribution and higher average molecular weight corresponding to the lower temperatures used in the heating step. Hence, polyblends can be tailor made to have certain critical physical properties showing the versatility of the process to change and control these properties either by varying the composition or the operating conditions or both. It is evident that the staged, isobaric stirred reactor preserves the morphology of the rubber particles giving rubber particles of the desired size and having desirable graft and occlusion levels contained in the rubber over a range of rubber concentrations in the monomer composition.

EXAMPLE 3

Lower Process Temperatures Versus Molecular Weight

Using the apparatus and procedure of Example 1, except where noted, the process was operated as follows:

a. The 100-gallon first reactor is operated at 112°C., and about 86% fillage,
b. The second reactor is operated at about 16 psia., 52% fillage, and the final stage syrup is at about 157°C.,
c. Polyblend rigid phase Staudinger molecular weight is about 57,000 and dispersion index is about 3.5.

d. Typical Product Properties of Polyblend

| | |
|---|---|
| Izod Impact ½" × ½" bar, 73°F. (ft.lb./in.) | 1.4 |
| Tensile strength at yield (lb./in.²) | 3850 |
| Tensile strength at fail (lb./in.²) | 3750 |
| Tensile elongation at fail (lb.in.²) | 45 |
| Swelling index | 9 |
| Rubber particle size (microns) | 1.50 |
| Parts graft and occlusions/parts rubber | 1.30 |

It is to be noted that the first reactor was run at 112°C., and the second reactor at 157°C., relative to Example 1 with corresponding temperatures of 124°C., and 166°C. This produces higher molecular weight first and second polymers respectively producing a combined polymer with an average molecular weight of 57,000 in Example 1. The dispersion index was 3.5 showing a broader molecular weight distribution reflecting a greater temperature differential between the two reactors. The preheater was again run at 240°C., producing a swelling index of about 9 as in Example 1. The process then can tailor make the molecular weight properties desired by adjusting the operating conditions in the two reaction zones yet preserving the morphology of the rubber particles at desired levels by using a staged isobaric stirred reactor of this invention.

EXAMPLE 4

Reactor Fillage Versus Output

Using the apparatus and procedures of Example 1, except as noted, the process was run at lower but constant fillage to demonstrate the capability of the process to vary output yet produce polyblend products having great utility but at varying rates depending on product need. Commercially the stopping and starting of continuous processes is costly because of the time needed to reach steady state conditions. The reactor of the present invention can be adjusted readily "onstream" to produce different polymers or less or more polymer as needed. It can be readily understood that one could run at low fillages and higher temperatures to produce low molecular weight polymers at high rates. Also, one could run at higher fillages and lower temperatures to produce more pounds of higher molecular weight polymer at high rates.

Using the procedures and conditions of Example 2, except when noted, reactor 1 and reactor 2 were run at relatively low fillage and the process operated as follows:

a. Monomer composition solution fed to the 100-gallon first reactor is about 100 lbs./hr.,
b. Fillage of the 100-gallon first reactor is about 35%,
c. The second reactor is operated at about 30% fillage,
d. The second mixture from the devolatilizer preheater is about 225°C.,
e. The polyblend was separated from the second mixture volatile phase.

The polyblend obtained had the following properties:

| | |
|---|---|
| Izod Impact (ft.lbs./in.) | 0.75 |
| Tensile strength at yield (lbs./in.²) | 5100 |
| Tensile strength at fail (lbs.in.²) | 4750 |
| Tensile elongation at fail | 40 |
| Swelling index of rubber | 11.0 |
| Rigid Phase Combined Polymer Dispersion Index | 2.9 |
| Rigid Phase Combined Staudinger Molecular Weight | 47,000 |
| Rubber Particle Size (microns) | 1.7 |
| Parts of graft and occlusions per parts of rubber | 1.45:1 |

It is evident that the process can operate at lower fillage, as compared to Example 2, yet produce a polyblend of about the same properties. The preheater was

PROCESS CONTROL OF RUBBER PARTICLE MORPHOLOGY IN THE SECOND REACTION ZONE

EXAMPLE 5

Control

A process comparison was made using two reactors both being single stage continuous stirred tank reactors (SSCSTR). The replacing of the continuous staged isobaric stirred tank reactor (CSISR) with the (SSCSTR) gave a rubber particle having lower than desirable amounts of grafting and occlusions being about 0.93 as compared to a preferred level of 1:5 parts to 1 part of rubber. This example demonstrates the problem of preserving the morphology of the rubber particles. When one charges the rubber dispersions from a (SSCSTR) having a conversion of 27% into a second (SSCSTR) that is operating at a conversion level of 64% the rubber particles lose occluded styrene monomer to the monomer-polymer phase by extraction lowering the level of occlusions in the final rubber particle. Examples 1–4 using a (SSCSTR) feeding a (CSISR) demonstrate that the (CSISR) operating with a first stage conversion at about the same level of conversions as the charged material from the (SSCSTR) does not extract the monomer occluded in the rubber particle. As the polymerizing first mixture moves through a plurality of stages by substantially linear flow the polymerization environment for the rubber particle is only gradually changed and the monomer in the rubber-monomer particle polymerizes at about the same rate as in the monomer-polymer phase preserving higher levels of graft and occlusions per parts of rubber.

A monomer composition containing 6 parts of the rubber described in Example 1 dissolved in 94 parts of styrene is charged at a rate of 90 lbs./hr. to a first (SSCSTR) maintained at 135°C., and approximately 27% polystyrene. The first mixture from this reactor is fed to a second (SSCSTR) maintained at 160°C., and 64% polystyrene. The second mixture from the second reactor flows to a preheater and devolatilizer. The devolatilized styrene is condensed and recycled to the first reactor. The devolatilized polymeric solids are formed into pellets which have the following properties:

| | |
|---|---|
| Izod Impact (½" × ½") | .9 ft.lb./in. |
| Staudinger Molecular Weight of Combined Polymer | 48,000 |
| Rubber particle size, Dw | 1.7 microns |
| Parts graft and occlusions/parts rubber | .93 |

EXAMPLE 6

Present Process

Example 5 was substantially repeated using a (CSISR) in place of a second (SSCSTR) to demonstrate the novel process of this invention. It is to be noted that the parts graft and occlusions per parts of rubber is at a ratio of 1.43 to 1 as compared to 0.93 for Example 5.

The feed monomer composition of Example 5 is fed at 102 lbs./hr. to the (SSCSTR) of Example 5 maintained at 135°C., and approximately 25% polystyrene. The first mixture from this reactor is fed to a (CSISR) similar to the second reactor of Example 1. The effluent from the second reactor is at 165°C., and contains approximately 66% polystyrene. This second mixture flows to a preheater and devolatilizes and the devolatilized styrene is condensed and recycled to the first reactor. The devolatilized polymeric solids are formed into pellets having the following properties:

| | |
|---|---|
| Izod Impact (½" × ½") | 1.1 ft.lb./in. |
| Staudinger Molecular Weight of Combined Polymer | 48,000 |
| Rubber particle size, Dw | 1.9 microns |
| Parts graft and occlusions/parts rubber | 1.43 |

SECOND ZONE POLYMERIZATION EFFICIENCY OF A (CSISR) VERSUS A (SSCSTR)

EXAMPLE 7

Second Zone (CSISR)

A first mixture from a first (SSCSTR) operating at 124°C. containing approximately 5.6% rubber described in Example 1 and 19% polystyrene is fed at 141 lbs./hr., to a second reactor consisting of a (CSISR) divided into seven stages. The fillage used in this second reactor at steady state is approximately 132 lbs., and the second mixture exiting the downstream compartment is at about 166°C., and contains polymeric solids of about 62% polystyrene and 5.6% rubber. Reactor pressure is about 20 psia. The combined polymer of polystyrene has a Staudinger Molecular Weight of about 51,000. Example 8 below demonstrates the lower efficiency of (SSCSTR) type reactors.

EXAMPLE 8

Second Zone (SSCSTR)

A first mixture from a (SSCSTR) similar to that described in Example 7 is fed at 141 lbs./hr., to a second (SSCSTR). This reactor is operated at steady state at 165°C., and a second mixture is formed having a polymeric solids content similar to that of the syrup in the downstream compartment of the reactor described in Example 7. It was found that the fillage of the (SSCSTR) had to be run at about 147 lbs., to provide the same percent polymeric solids in the second mixture exiting from the second reactor. Hence, the staged isobaric stirred reactor can produce the same percent polymeric solids in Example 7 with about 11% less gravimetric fillage than a continuous stirred tank reactor operating under the same conditions. This capability is based on the fact that the styrene monomers are being removed from the downstream stages where the rates of polymerization are relatively slow and bringing them back to the first stage where the polymerization rates are relatively high. Also, this capability is based on the fact that the (CSISR) second stage process provides for a higher rate of conversion of monomer to polymer in the earlier stages providing an overall higher conversion rate for a multistage reactor than a single stage reactor operating at the same final conversion level. Hence, the (CSISR) converts more monomer to polymer per unit volume and fillage of reactor. The use of a staged isobaric stirred reactor to realize higher overall polymerization rates for a single reaction zone was found to be novel providing a reactor of great utility in the manufacture of polyblends.

POLYMERIZATION EFFICIENCY OF STAGED ISOBARIC STIRRED PROCESS AT HIGHER CONVERSIONS

EXAMPLE 9

Second Zone (CSISR)

A first mixture from a first reaction zone as described in Example 1 and operating at 124°C., containing approximately 6.5% rubber and 22% polystyrene is fed at 123 lbs./hr., to a second zone (CSISR) divided into seven stages. At steady state the fillage of the second zone is approximately 146 lbs., and the first mixture entering the first stage is 124°C., and second mixture exiting the downstream stage is at about 174°C., contains about 71.5% polystyrene and 6.5% rubber. Reactor pressure is about 20 psia and the combined polymer of polystyrene has a Staudinger molecular weight of about 50,000.

EXAMPLE 10

Second Zone (SSCSTR)

A first mixture similar to that described in Example 9 is fed at 123 lbs./hr., to a (SSCSTR). This reactor is operated at steady state at 162°C., and a second mixture similar to that of the second mixture exiting the downstream compartment of the reactor described in Example 9. It was found that the fillage of this reactor had to be about 284 lbs., approximately 94% higher than that of the reactor of Example 9 to produce the same final level of conversion. Example 10 using a single stage continuous stirred tank reactor process instead of a staged isobaric reactor process of this invention as a second zone demonstrates that such a process requires roughly twice the filling volume in the reactor to produce to same conversion level in the second mixture meaning that the polyrate is about 50% of a staged reactor process both running at the same throughput. The volume efficiency of the staged reactor process was unexpectedly high. Also the ability of the process to maintain the morphology of the rubber particle through its progressive staged polymerization has made the process of great utility in the production of rubber reinforced polymeric polyblends.

EXAMPLE 11

Linear Flow Characteristics A Staged Isobaric Stirred Reactor

Using the feed materials, procedures and apparatus of Example 1, except where noted, a first mixture from reactor 1 was fed to the SISR reactor operating at 161°C., in the final stage and with an agitator speed of 25 rpm. The rotating baffles in the reactor were varied in number and location to determine their effect on the level of conversion reached in each stage of the reactor. Three configurations were used having three, five, and nine stages. The reacting mixture was analyzed in each stage for percent solids after steady state polymerization was reached in the reactor. The percent solids correlates with the level of conversion found in each stage.

A first run using three stages or chambers was made. The chambers varied in length with the first being about 29.5 inches long, the second about 11 inches and the third about 12.5 inches. The solids level in the corresponding chambers was about 37.5%, 49.5% and 72%. The first mixture from the initial reactor entering the first chamber had about 26% solids of which 8% was rubber and 18% polystyrene. It is evident that the level of conversion in each compartment is increasing showing a net forwarding of materials or flow through the reactor even though some back mixing can occur. This net forward flow demonstrates that the reactor has a net linear flow defined as substantial linear flow in the present invention. Those skilled in the art will recognize that if the flow was not substantially linear, the percent solids in each stage would be about same, characteristic of a single stage reactor. As already discussed, it is important in the present invention that the first mixture be charged to a substantially linear flow, staged second reactor zone or the rubber particle will lose a portion of its monomer phase and have a lower level of occlusions.

A second run was made using five stages of about 30, 5, 5, 5, and 8 inches respectively. The solids content was measured as 36.5% in the first stage, 49.5% in the third stage and 72.0% in the fifth stage showing a net forward flow and substantially linear flow through the reactor.

A third run was made using nine stages of about 16, 4, 4, 4, 4, 4, 4, 4 and 9 inches respectively. The solids content of the first mixture entering the first stage was about 20% with the solids content of the first stage measured as 23.5%, second as 25%, the fourth as 31%, the seventh as 44.5% and the ninth as 68%. The above data show a net forward flow and substantially linear flow through the reactor.

It will be appreciated that, while the embodiments of the present invention as shown and described herein are necessarily limited to a few forms of the present invention, many variations and modifications thereof are feasible and practical without departing from the spirit and scope of the present invention discussed and claimed herein.

What is claimed is:

1. A continuous staged, isobaric, stirred reactor apparatus for operation in a generally horizontal configuration at partial fillage levels with evaporative cooling and for the continuous exothermic polymerization of monomers in a fluid reaction media under substantially linear flow conditions, said apparatus comprising:
    a. a generally cylindrical, enclosed vessel, for operation in a generally horizontal configuration with input and output ports at opposite end regions thereof,
    b. at least one shaft extending generally longitudinally through said vessel for axial rotational movements relative thereto,
    c. at least one baffle-like member, each such member (1) extending generally radially and transversely across the interior of said vessel, (2) partitioning said vessel internally into staged chambers, (3) being longitudinally fixed relative to said shaft means, (4) defining during operation of said apparatus, radial clearances with said vessel interior wall and between adjacent chambers defining a top aperture for passage of vapor and a bottom aperture for passage of polymerizing fluid, d. agitator blade means mounted on said shaft means and positioned in each of said staged chambers to maintain polymerizing fluid partially filling said vessel in each of said chambers during operation of said apparatus in horizontal configuration in a generally uniform and homogeneous condition, e. drive means, coupled with that shaft means to rotatably drive same during operation of said apparatus, f. vapor removal means comprising a vapor outlet port, a condenser and a receiver interconnected with an upper portion of said vessel to remove vapors evolved from fluid in said vessel in each of said chambers during operation of said apparatus, g. condition sensing means to measure temperature and pressure in at least one of said chambers during operation of said apparatus and to convert the so measured values into at least one condition signal representative thereof, h. set points means to generate a signal representative of a predetermined temperature desired in a predetermined one of said chambers, i. pressure control means interconnected with said vapor removal means, said condition sensing means, said set point means, a vent valve and a pressurized nitrogen valve regulating the pressure and the rate at which said condenser withdraws and condenses said vapors such that the temperature in at least one of said chambers is maintained with operating limits at a predetermined temperature and j. flow regulating means interconnected with said input and output ports to maintain the average level of fluid in said vessel in each of said stated chambers within predetermined limits.

2. An apparatus of claim 1, wherein said clearance between said baffle-like member, fixed and rotating with said shaft and an interior wall of said reactor vessel is from about 1 to 10% of the vessel radius providing said top and bottom apertures.

3. An apparatus of claim 1 having a dome interconnected with a upper portion of the vessel above each baffle-like member so as to enlarge said clearance insuring the passage of vapor through said top aperture.

4. An apparatus of claim 1, wherein said agitator blade means is a flat plate radially extending from said shaft means toward said reactor vessel wall having a clearance with said wall of from about 1 to 10% of the vessel radius.

5. An apparatus of claim 1, wherein said agitator blade means is a curved plate radially extending from said shaft means toward said reactor vessel wall having clearances with said wall of from about 1 to 10% of the vessel radius.

6. An apparatus of claim 1, wherein said agitator blade means is a bent plate radially extending from the shaft means toward the reactor vessel wall having a clearance with said wall of from about 1% to 10% of the vessel radius.

7. An apparatus of claim 1, wherein each said staged chamber has at least one pair of said agitator blades, each blade of a pair being mounted at about 180° to the other blade.

8. An apparatus of claim 7, wherein each of said chambers has a plurality of pairs of said agitator blades, each pair being mounted at about 90° to the adjacent pair.

9. An apparatus of claim 1, wherein said drive means is a drive motor coupled with a variable speed regulator and said shaft means for rotation of said shaft means.

10. An apparatus of claim 1, wherein said flow regulating means interconnected with said output port comprises a level controller, an output port pump and a motor interconnected with said output port to maintain the average level of fluid in said vessel in each of said staged chambers within predetermined limits.

11. An apparatus of claim 1, wherein said condition sensing means comprises a temperature probe.

12. An apparatus of claim 1, wherein said point means comprises a set point generator.

13. An apparatus of claim 1, wherein said vapor removal means comprises, said vapor outlet port, said condenser and a receiver all interconnected with pipe means to said reactor vessel and connected with said control means for regulating the quantity of said vapor withdrawn from said vessel.

14. An apparatus of claim 13, wherein said receiver is interconnected with said input port by a recycle means for said condensed vapors said recycle means being controlled by a level controller connected with said receiver.

15. A continuous staged, isobaric, stirred reactor apparatus for operation in a generally horizontal configuration at partial fillage levels with evaporative cooling and for the continuous exothermic polymerization of monomers in a fluid reaction media under substantially linear flow conditions, said apparatus comprising:

a. a generally cylindrical, enclosed vessel, for operation in a generally horizontal configuration with input and output ports at opposite end regions thereof, b. at least one shaft extending generally longitudinally through said vessel for axial rotational movements relative thereto, c. at least one baffle-like member, each such member (1) extending generally radially and transversely across the interior of said vessel, (2) partitioning said vessel internally into staged chambers, (3) being longitudinally fixed relative to said vessel having a close tolerance opening to accommodate said shaft and, (4) having portions defining top and bottom apertures, said top aperture for passage of vapor and said bottom aperture for passage of polymerizing fluid between adjacent chambers, d. agitator blade means mounted on said shaft means, positioned in each of said staged chambers to maintain polymerizing fluid partially filling said vessel in each of said chambers during operation of said apparatus in horizontal configuration in a generally uniform and homogeneous condition, e. drive means coupled with said shaft means to rotatably drive same during operation of said apparatus, f. vapor removal means comprising a vapor outlet port, a condenser and a receiver interconnected with an upper portion of said vessel to remove vapors evolved from fluid in said vessel in each of said chambers during operation of said apparatus, g. condition sensing means to measure temperature, and pressure in at least one of said chambers during operation of said apparatus and to convert the so measured values into at least one condition signal representative thereof, h. set point means to generate a signal representative of a predetermined temperature desired in a predetermined one of said chambers, i. pressure control means interconnected with said vapor removal means, said condition sensing means, said set point means, a vent valve and a pressurized nitrogen valve regulating the pressure and the rate at which said condenser withdraws and condenses said vapors such that the temperature in at least one of said chambers is maintained within operating limits at a predetermined temperature and j. flow regulating means interconnected with said input and output ports to maintain the average level of fluid in said vessel in each of said staged chambers within predetermined limits.

16. An apparatus of claim 15, said baffle having portions defining sized fixed top and bottom apertures between the baffle and the interior wall of the vessel.

17. An apparatus of claim 15, said baffle having portions defining at least one sized fixed top aperture and an adjustable bottom aperture having a gate controlled by a mechical means.

18. An apparatus of claim 15, said baffle having portions defining adjustable top and bottom apertures having gates controlled by mechanical means.

19. A continuous staged, isobaric stirred reactor apparatus of claim 15, wherein said vapor removal means comprises individual vapor removal ports interconnected with each upper wall portion of said vessel forming each chamber, said individual vapor removal ports having a common manifold interconnected with said condenser and said receiver.

20. A continuous staged, isobaric, stirred reactor apparatus for operation in a generally horizontal configuration at partial fillage levels with evaporative cooling and for the continuous exothermic polymerization of monomers in a fluid reaction media under substantially linear flow conditions, said apparatus comprising:

a. a generally cylindrical, enclosed vessel, for operation in a generally horizontal configuration with input and output ports at opposite end regions thereof, b. at least one shaft extending generally longitudinally through said vessel for axial rotational movements relative thereto, c. at least one baffle-like member, each such member (1) extending generally radially and transversely across the interior of said vessel, (2) partitioning said vessel internally into staged chambers, defining during operation of said apparatus, radial clearances with said vessel interior wall and between adjacent chambers defining a top aperture adapted for passage of vapor and a bottom aperture adapted for passage of polymerizing fluid, d. agitator blade means mounted on said shaft means, positioned in each of said staged chambers to maintain polymerizing fluid partially filling said vessel in each of said chambers during operation of said apparatus in horizontal configuration in a generally uniform and homogeneous condition, e. drive means coupled with said shaft means to rotatably drive same during operation of said apparatus, f. a reflux condensing means interconnected with the upper portion of said vessel to condense said vapors evolved from the fluid in said vessel and return them to said vessel, during operation of said apparatus, g. condition sensing means to measure temperature, and pressure in at least one of said chambers during operation of said apparatus and to convert the so measured values into at least one condition signal representative thereof, h. set point means to generate a signal representative of a predetermined temperature desired in a predermined one of said chambers, i. control means interconnected with a vapor vent means, said condition sensing means and said set point means regulating the pressure such that the temperature in at least one of the chambers is maintained within operating limits at a predetermined temperature, j. flow regulating means interconnected with said input and output ports to maintain the average level of fluid in said vessel in each of said staged chambers within predetermined limits.

21. An apparatus of claim 20, wherein said reflux condensing means is a cooled upper portion of said vessel interior wall associated with a cooling jacket.

22. An apparatus of claim 20, wherein said reflux condensing means is at least one reflux condenser interconnected with the upper portion of said vessel.

23. An apparatus of claim 20, wherein the baffle-like member is longitudinally fixed to said vessel having a close tolerance opening for said shaft and having portions defining top and bottom apertures.

24. An apparatus of claim 20, wherein the baffle-like member is longitudinally fixed to said vessel having a close tolerance opening for said shaft and having at least one portion defining at least one sized fixed top aperture and an adjustable bottom aperture having a gate controlled by mechanical means.

25. An apparatus of claim 20, wherein the baffle-like member is longitudinally fixed relative to said shaft means, defining during operation of said apparatus, radial clearances with said vessel interior wall and between adjacent chambers defining a top aperture for passage of vapor and a bottom aperture for passage of polymerization fluid.

* * * * *